United States Patent
Liang

(10) Patent No.: US 9,981,865 B2
(45) Date of Patent: May 29, 2018

(54) ELECTROCHEMICAL SEPARATION DEVICE

(71) Applicant: Evoqua Water Technologies LLC, Warrendale, PA (US)

(72) Inventor: Li-Shiang Liang, Harvard, MA (US)

( * ) Notice: Subject to any disclaimer, the term of this patent is extended or adjusted under 35 U.S.C. 154(b) by 305 days.

(21) Appl. No.: 14/442,515

(22) PCT Filed: Mar. 15, 2013

(86) PCT No.: PCT/US2013/032068
§ 371 (c)(1),
(2) Date: May 13, 2015

(87) PCT Pub. No.: WO2014/077887
PCT Pub. Date: May 22, 2014

(65) Prior Publication Data
US 2016/0236954 A1    Aug. 18, 2016

Related U.S. Application Data

(60) Provisional application No. 61/727,914, filed on Nov. 19, 2012.

(51) Int. Cl.
| | | |
|---|---|---|
| *C02F 1/469* | (2006.01) |
| *C02F 1/461* | (2006.01) |
| *B01D 61/46* | (2006.01) |
| *B01D 63/10* | (2006.01) |
| *B01D 61/52* | (2006.01) |
| *B01D 63/08* | (2006.01) |
| *B01D 63/14* | (2006.01) |
| *B01D 61/48* | (2006.01) |

(52) U.S. Cl.
CPC ............ *C02F 1/4695* (2013.01); *B01D 61/46* (2013.01); *B01D 61/485* (2013.01); *B01D 61/52* (2013.01); *B01D 63/082* (2013.01); *B01D 63/10* (2013.01); *B01D 63/14* (2013.01); *C02F 1/4693* (2013.01); *C02F 1/46109* (2013.01); *B01D 2313/08* (2013.01); *B01D 2313/20* (2013.01); *B01D 2313/345* (2013.01); *C02F 2201/4611* (2013.01); *C02F 2201/46115* (2013.01); *Y02W 10/33* (2015.05); *Y02W 10/37* (2015.05)

(58) Field of Classification Search
CPC ............................. C02F 1/4693; C02F 1/4695
See application file for complete search history.

(56) References Cited

U.S. PATENT DOCUMENTS

| | | |
|---|---|---|
| 1,425,752 A | 8/1922 | Davis |
| 5,147,737 A | 9/1992 | Post et al. |
| 5,292,422 A | 3/1994 | Liang et al. |
| 5,954,937 A | 9/1999 | Farmer |
| 6,309,532 B1 | 10/2001 | Tran et al. |
| 7,195,840 B2 | 3/2007 | Kaun |
| 7,306,709 B2 | 12/2007 | Grebenyuk et al. |
| 7,591,933 B2 | 9/2009 | Grebenyuk et al. |

(Continued)

FOREIGN PATENT DOCUMENTS

CN            2811266Y Y      8/2006

*Primary Examiner* — Brian W Cohen

(57) ABSTRACT

Systems and methods for electrochemical separation are provided. An electrochemical separation device may include at least one cell pair wound around an electrode to from a bundle having a racetrack configuration.

5 Claims, 9 Drawing Sheets

(56) References Cited

U.S. PATENT DOCUMENTS

| | | | |
|---|---|---|---|
| 2004/0060823 A1* | 4/2004 | Carson | B01D 61/46 204/627 |
| 2007/0215474 A1 | 9/2007 | Batchelder et al. | |
| 2009/0314659 A1* | 12/2009 | Field | A47L 11/4041 205/770 |
| 2011/0284376 A1 | 11/2011 | Ng et al. | |

* cited by examiner

US 9,981,865 B2

ELECTROCHEMICAL SEPARATION DEVICE

CROSS-REFERENCE TO RELATED APPLICATIONS

This application is a U.S. National Phase Application under 35 U.S.C. § 371 of International (PCT) Patent Application Serial No. PCT/US2013/032068, filed on Mar. 15, 2013 and titled "ELECTROCHEMICAL SEPARATION DEVICE" which in turn claims priority under 35 U.S.C. § 119(e) to U.S. Provisional Patent Application Ser. No. 61/727,914, filed on Nov. 19, 2013 and titled "ELECTRODIALYSIS DEVICE WITH CELL PAIRS WOUND IN RACETRACK-SHAPED PATTERN."

FIELD OF THE DISCLOSURE

Aspects relate generally to electrochemical separation and, more particularly, to electrochemical separation systems and methods involving ion exchange membranes arranged in a racetrack configuration.

SUMMARY

In accordance with one or more aspects, an electrochemical separation device may include a first electrode, at least one cell pair comprising an anion exchange membrane and a cation exchange membrane wound around the first electrode to form a bundle having a racetrack configuration, and a second electrode surrounding the bundle.

In some aspects, the device may be configured such that diluting and concentrating streams flow co-currently from the first electrode to the second electrode. The first electrode may comprise an anode and the second electrode may comprise a cathode. The anode may comprise a straight section with a semi-circular section at each end to define a substantially elongated S-shaped anode. The anode may further comprise a fastener such as a fastening tab at each end to secure the at least one cell pair. The anode may be coated with an oxidation resistant material.

In some aspects, the anode may be segmented. The device may further comprise a spacer configured to maintain a predetermined distance between first and second segments of the anode. In other aspects, the cathode may be segmented. The device may further comprise a manifold for facilitating fluid flow through the at least one cell pair.

In some aspects, at least one end of the bundle is sealed with an adhesive. A vessel may be configured to receive the bundle. The vessel may comprise endblocks. The device may be characterized by a membrane utilization of at least about 85%.

In some aspects, a cross-section of the bundle has a substantially straight section and a curved section at first and second ends of the substantially straight section. The current density may be substantially uniform throughout the substantially straight section of the bundle. A ratio of a length of the substantially straight section to a height of each of the curved sections may be greater than zero. In at least some aspects, the height of the curved sections is not dependent on the number of cell pairs. In some aspects, the anion exchange membrane and the cation exchange membrane are planar and parallel along the substantially straight section of the bundle. The bundle may generally have two axes of symmetry.

In some aspects, a water treatment system may include an electrochemical separation device having a first electrode, at least one cell pair comprising an anion exchange membrane and a cation exchange membrane wound around the first electrode to form a bundle having a racetrack configuration, and a second electrode surrounding the bundle.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1:
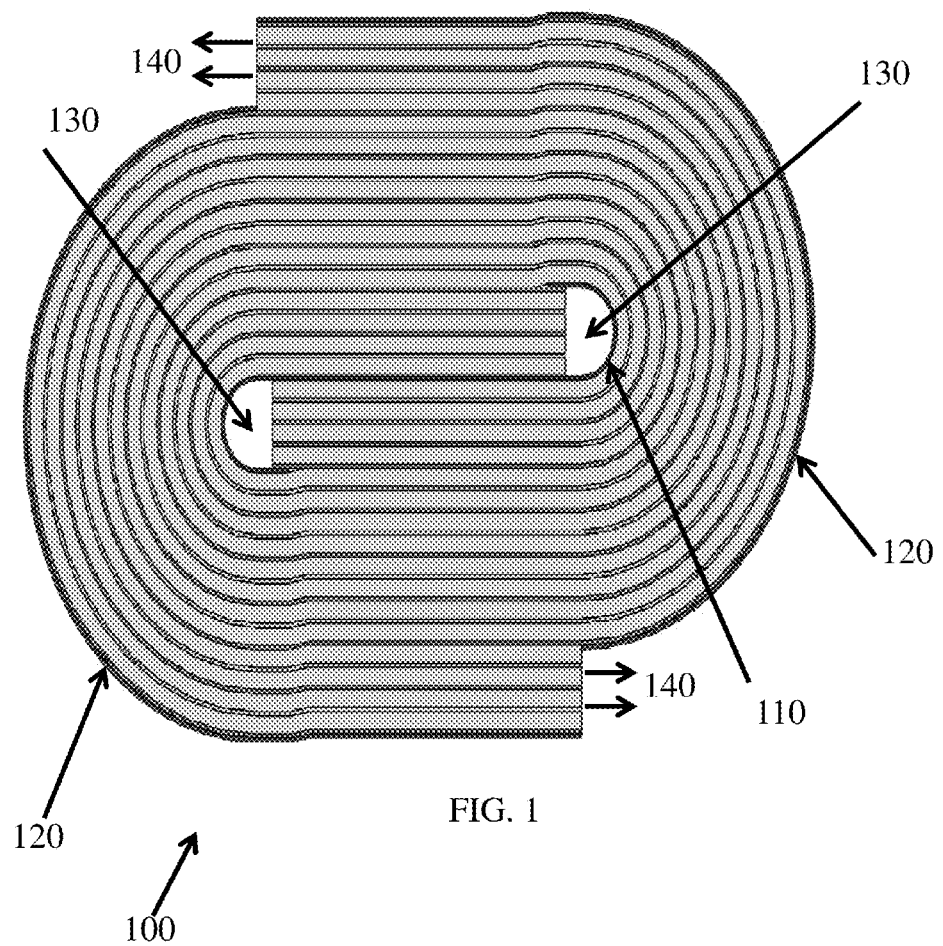
FIG. 1 presents a cross-sectional schematic of an electrochemical separation device in accordance with one or more embodiments.

Devices for purifying fluids using electrical fields are commonly used to treat water and other liquids containing dissolved ionic species. Two types of devices that treat water in this way are electrodeionization and electrodialysis devices. Within these devices are concentrating and diluting compartments separated by ion-selective membranes. An electrodialysis device typically includes alternating electroactive semipermeable anion and cation exchange membranes. Spaces between the membranes are configured to create liquid flow compartments with inlets and outlets. An applied electric field imposed via electrodes causes dissolved ions, attracted to their respective counter-electrodes, to migrate through the anion and cation exchange membranes. This generally results in the liquid of the diluting compartment being depleted of ions, and the liquid in the concentrating compartment being enriched with the transferred ions.

Electrodeionization (EDI) is a process that removes, or at least reduces, one or more ionized or ionizable species from water using electrically active media and an electric potential to influence ion transport. The electrically active media typically serves to alternately collect and discharge ionic and/or ionizable species and, in some cases, to facilitate the transport of ions, which may be continuously, by ionic or electronic substitution mechanisms. EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance. Further, such electrochemical devices may comprise electrically active membranes, such as semipermeable or selectively permeable ion exchange or bipolar membranes. Continuous electrodeionization (CEDI) devices are EDI devices known to those skilled in the art that operate in a manner in which water purification can proceed continuously, while ion exchange material is continuously recharged. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

Electrodialysis (ED) devices operate on a similar principle as CEDI, except that ED devices typically do not contain electroactive media between the membranes. Because of the lack of electroactive media, the operation of ED may be hindered on feed waters of low salinity because of elevated electrical resistance. Also, because the operation of ED on high salinity feed waters can result in elevated electrical current consumption, ED apparatus have heretofore been most effectively used on source waters of intermediate salinity. In ED based systems, because there is no electroactive media, splitting water is inefficient and operating in such a regime is generally avoided.

In CEDI and ED devices, a plurality of adjacent cells or compartments are typically separated by selectively permeable membranes that allow the passage of either positively or negatively charged species, but typically not both. Dilution or depletion compartments are typically interspaced with concentrating or concentration compartments in such devices. In some embodiments, a cell pair may refer to a pair of adjacent concentrating and diluting compartments. As water flows through the depletion compartments, ionic and other charged species are typically drawn into concentrating compartments under the influence of an electric field, such as a DC field. Positively charged species are drawn toward a cathode, typically located at one end of a stack of multiple depletion and concentration compartments, and negatively charged species are likewise drawn toward an anode of such devices, typically located at the opposite end of the stack of compartments. The electrodes are typically housed in electrolyte compartments that are usually partially isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the cathode, out of the concentration compartment, by a cation selective membrane. Once captured in the concentrating compartment, trapped charged species can be removed in a concentrate stream.

In CEDI and ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or for example, a power source derived from solar, wind, or wave power. At the electrode/liquid interfaces, electrochemical half cell reactions occur that initiate and/or facilitate the transfer of ions through the membranes and compartments. The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ion, while such a feed to the cathode electrolyte compartment will tend to generate hydrogen gas and hydroxide ion. Generally, the hydrogen ion generated at the anode compartment will associate with a free anion, such as chloride ion, to preserve charge neutrality and create hydrochloric acid solution, and analogously, the hydroxide ion generated at the cathode compartment will associate with a free cation, such as sodium, to preserve charge neutrality and create sodium hydroxide solution. The reaction products of the electrode compartments, such as generated chlorine gas and sodium hydroxide, can be utilized in the process as needed for disinfection purposes, for membrane cleaning and defouling purposes, and for pH adjustment purposes.

In traditional plate-and-frame ED designs, the diluting and concentrating streams are in parallel, either co-flow or counter-flow. Another possible design involves cross-flow devices, in which the diluting and concentrating streams are perpendicular to each other. Compared to plate-and-frame design, the cross-flow design has the advantage of higher membrane utilization and lower pressure drop. Both the plate-and-frame and cross-flow designs have alternating anion and cation membranes that are planar and separated by screens. Each stack of parallel components is bounded at both ends by electrodes. Current flows from the anode to the cathode though each membrane in series, other than a fraction that bypasses the stack by flowing through the inlet and outlet manifolds (leakage current). If the leakage current were a small fraction of the overall current, the average current density would be substantially uniform throughout the stack. As the feed water flows through a diluting compartment, the rate of ion transfer to the adjacent concentrating compartments would therefore be about the same along the flow path.

Plate-and-frame and spiral wound designs have been used for various types of electrochemical deionization devices including but not limited to electrodialysis (ED) and electrodeionization (EDI) devices. Commercially available ED devices are typically of plate-and-frame design, while EDI devices are available in both plate and frame and spiral configurations. In spiral-wound designs, devices can be constructed with the membranes and screens wound in spirals around an electrode in the center; the other electrode being wrapped around the periphery. The diluting and concentrating streams can flow radially in spiral paths, inward or outward, co-current or counter-current. Alternatively one of the streams can be radial and other in an axial direction. In a common configuration, the inner electrode is an anode and the outer electrode a cathode. Feed water, such as seawater, is introduced into the center and fed to the diluting and concentrating compartments. Both streams flow outward in a spiral path towards the cathode. The ends of the spiral bundle are sealed with potting adhesive. The product and reject are collected at the outer ends of the spiral compartments.

Conventional spiral-wound designs may have certain advantages over plate-and-frame designs. Their only leakage current is the current that flows along the spiral paths instead of through the membranes and is expected to be minimal. The assembly of the device has fewer steps and is easier to automate. Components such as spacers in plate-and-frame are not necessary. Spiral-wound designs have certain disadvantages as well including that the current density decreases as the distance from the inner electrode increases, so the rate of ionic transfer from the dilute stream decreases as the diluting stream spirals outward. In order to remove the amount of ions required for an application, the membrane area can be increased by increasing the length of the spirals or the dilute velocity can be decreased, thereby increasing the residence time. Increasing the membrane areas and spiral length increases the cost of membranes and the pressure drop. The additional membrane areas are further away from the inner electrode with even lower current density. Furthermore, since water loss is present due to electro-osmosis and osmosis, the flow rate of the final product water is further reduced, so that the energy and capital cost per unit product increase. It is therefore possible to be in a diminishing return scenario in which a cost competitiveness design is not possible. The number of cell pairs, and therefore the product flow rate, is limited by the size of the gaps between the anode segments and the difficulty of winding a large number of sheets. Increasing the radii of the segments, however, increases the cost of the anode, which must be made of expensive oxidation resistant materials such as platinum coated titanium. In order to achieve the salt removal required, the current density at the anode may be unacceptably high, on the order of several hundred amp/m$^2$.

In accordance with one or more embodiments, a racetrack configuration may provide certain advantages associated with spiral designs while minimizing their disadvantages.

One or more embodiments relate to devices that may purify fluids electrically that may be contained within a housing, as well as methods of manufacture and use thereof. Liquids or other fluids to be purified enter the purification device and, under the influence of an electric field, are treated to produce an ion-depleted liquid. Species from the entering liquids are collected to produce an ion-concentrated liquid.

In accordance with one or more embodiments, the efficiency of electrochemical separation systems may be improved. Current loss is one potential source of inefficiency. In some embodiments, the potential for current leakage may be addressed. Current efficiency may be defined as the percentage of current that is effective in moving ions out of the dilute stream into the concentrate stream. Various sources of current inefficiency may exist in an electrochemical separation system. In a cross-flow device, for example, one potential source of inefficiency may involve current that bypasses the cell pairs by flowing through the dilute and concentrate inlet and outlet manifolds. Open inlet and outlet manifolds may be in direct fluid communication with flow compartments and may reduce pressure drop in each flow path. Part of the electrical current from one electrode to the other may bypass the stack of cell pairs by flowing through the open areas. The bypass current reduces current efficiency and increases energy consumption. Another potential source of inefficiency may involve ions that enter the dilute stream from the concentrate due to imperfect permselectivity of ion exchange membranes. In some embodiments, various techniques and designs may facilitate reduction of current leakage.

In accordance with one or more embodiments, an electrochemical separation device may include a racetrack configuration to prevent current leakage.

In one or more embodiments, a bypass path through a stack may be manipulated to promote current flow along a direct path through a cell stack so as to improve current efficiency. In some embodiments, an electrochemical separation device may be constructed and arranged such that one or more bypass paths are more tortuous than a direct path through the cell stack. In at least certain embodiments, an electrochemical separation device may be constructed and arranged such that one or more bypass paths present higher resistance than a direct path through the cell stack. In some embodiments, current efficiency of at least about 60% may be achieved. In other embodiments, a current efficiency of at least about 70% may be achieved. In still other embodiments, a current efficiency of at least about 80% may be achieved. In at least some embodiments, a current efficiency of at least about 85% may be achieved. In some embodiments, a current efficiency of at least about 90% may be achieved.

In accordance with one or more embodiments, the flow within a compartment may be adjusted, redistributed, or redirected to provide greater contact of the fluid with the membrane surfaces within the compartment. The compartment may be constructed and arranged to redistribute fluid flow within the compartment. The compartment may have obstructions, projections, protrusions, flanges, or baffles that may provide a structure to redistribute the flow through the compartment, which will be discussed further below. In certain embodiments, the obstructions, projections, protrusions flanges, or baffles may be referred to as a flow redistributor. A flow redistributor may be present in one or more of the compartments of the cell stack.

Each of the compartments in the cell stack for an electrical purification apparatus may be constructed and arranged to provide a predetermined percentage of surface area or membrane utilization for fluid contact. It has been found that greater membrane utilization provides greater efficiencies in the operation of the electrical purification apparatus. Advantages of achieving greater membrane utilization may include lower energy consumption, smaller footprint of the apparatus, less passes through the apparatus, and higher quality product water. In certain embodiments, the membrane utilization that may be achieved is greater than 65%. In other embodiments, the membrane utilization that may be achieved is greater than 75%. In certain other embodiments, the membrane utilization that may be achieved may be greater than 85%. The membrane utilization may be at least in part dependent on the methods used to secure each of the membranes to one another, and the design of any spacer. In order to obtain a predetermined membrane utilization, appropriate securing techniques and components may be selected in order to achieve a reliable and secure seal that allows optimal operation of the electrical purification apparatus, without encountering leakage within the apparatus. In some embodiments, stack production processes may involve thermal bonding techniques to maximize membrane utilization, while maintaining a large surface area of membrane that may be used in the process.

In accordance with one or more embodiments, an electrical purification apparatus comprising a cell stack is provided. The electrical purification apparatus may comprise a first compartment comprising ion exchange membranes and may be constructed and arranged to provide a direct fluid flow in a first direction between the ion exchange membranes. The electrical purification apparatus may also comprise a second compartment comprising ion exchange membranes and may be constructed and arranged to provide a direct fluid flow in a second direction. Each of the first compartment and the second compartment may be constructed and arranged to provide a predetermined percentage of surface area or membrane utilization for fluid contact.

An electrical purification apparatus may comprise a cell stack. The electrical purification apparatus may comprise a first compartment comprising a first cation exchange membrane and a first anion exchange membrane, the first compartment constructed and arranged to provide a direct fluid flow in a first direction between the first cation exchange membrane and the first anion exchange membrane. The apparatus may also comprise a second compartment comprising the first anion exchange membrane and a second cation exchange membrane to provide a direct fluid flow in a second direction between the first anion exchange membrane and the second cation exchange membrane. Each of the first compartment and the second compartment may be constructed and arranged to provide a predetermined membrane utilization, for example, a fluid contact of greater than 85% of the surface area of the first cation exchange membrane, the first anion exchange membrane and the second cation exchange membrane. At least one of the first compartment and the second compartment may comprise a spacer, which may be a blocking spacer.

In accordance with one or more embodiments, the electrical purification apparatus comprising a cell stack may further comprise a housing enclosing the cell stack, with at least a portion of a periphery of the cell stack secured to the housing. A frame may be positioned between the housing and the cell stack. A flow redistributor may be present in one or more of the compartments of the cell stack. At least one of the compartments may be constructed and arranged to provide flow reversal within the compartment.

In some embodiments of the disclosure, a cell stack for an electrical purification apparatus is provided. The cell stack may provide a plurality of alternating ion depleting and ion concentrating compartments. A spacer may be positioned in the cell stack. The spacer may provide structure to and define the compartments and, in certain examples, may assist in directing fluid flow through the compartment. The spacer may be a blocking spacer which may be constructed and arrange to redirect at least one of fluid flow and electrical current through the cell stack. As discussed, the blocking spacer may reduce or prevent electrical current inefficiencies in the electrical purification apparatus.

In accordance with one or more embodiments, a housing may include electrodes. Endplates may include the electrodes. The electrical purification apparatus may comprise a first electrode at an interior of the bundle and a second electrode surrounding the bundle. The first electrode may be an anode and the second electrode may be a cathode in some embodiments. In other embodiments, the first electrode may be a cathode and the second electrode may be an anode. One or both of the electrodes may be segmented as discussed herein.

The fluid flow in the first direction may be a diluting stream and the fluid flow in the second direction may be a concentrating stream. In certain embodiments, the fluid flow in the first direction may be converted to a concentrating stream and the fluid flow in the second direction may be converted to a diluting stream with the use of polarity reversal where the applied electrical field is reversed thus reversing the stream function. Multiple spacer assemblies separated by spacers may be secured together to form a stack of cell pairs, or a membrane cell stack.

The electrical purification apparatus of the present disclosure may further comprise a housing that encloses the cell stack. At least a portion of the periphery of the cell stack may be secured to the housing. A frame or support structure may be positioned between the housing and the cell stack to provide additional support to the cell stack. The frame may also comprise inlet manifolds and outlet manifolds that allow the flow of liquid in and out of the cell stack. The frame and the cell stack together may provide an electrical purification apparatus modular unit. The electrical purification apparatus may further comprise a second modular unit secured within the housing. Adhesive may be applied to seal at least a portion of the periphery of the cell stack to the inside wall of the housing.

In certain embodiments of the disclosure the flow within a compartment may be adjusted, redistributed, or redirected to provide greater contact of the fluid with the membrane surfaces within the compartment. The compartment may be constructed and arranged to redistribute fluid flow within the compartment. The compartment may have obstructions, projections, protrusions, flanges, or baffles that may provide a structure to redistribute the flow through the compartment. The obstructions, projections, protrusions, flanges, or baffles may be formed as part of ion exchange membranes, the spacer, or may be an additional separate structure that is provided within the compartment.

This invention is not limited in use to electrodialysis equipment. Other electrochemical deionization device such as electrodeionization (EDI) or continuous electrodeionization (CEDI) can also be constructed using a racetrack configuration. Potential applications include desalination of seawater, brackish water and brines from oil and gas production.

In accordance with one or more embodiments, an electrochemical separation device is provided. In some embodiments, the electrochemical separation device may be an electrodialysis device. In other embodiments, the electrochemical separation device may be an electrodeionization device. According to certain embodiments, the electrochemical separation device may comprise an electrode and at least one cell pair. The cell pair may comprise an anion and cation exchange membrane. In at least some embodiments, the ion exchange membranes may be wound around the electrode to form a bundle. The bundle may have a racetrack configuration. In various embodiments, the electrochemical separation device may further comprise a second electrode that is configured to surround the bundle. One or both of the electrodes may be segmented to accommodate the racetrack configuration of the bundle. In certain embodiments, the electrochemical separation device may further comprise a manifold for facilitating fluid flow through the at least one cell pair of the bundle.

In accordance with one or more embodiments, a racetrack configuration may combine the advantages of plate-andframe, cross-flow and spiral wound ED devices. In the membrane area bound by the straight sections of the anode and cathode segments, the membranes are planar and parallel, as in plate-and-frame and cross-flow devices. The current density is substantially uniform and the rate of ionic removal from the diluting compartments is not a function of the distance from the inner electrode. The only membrane area not active in ionic transfer is the small fraction encapsulated in the potting compound. Membrane utilization of over 85% is expected, as in cross-flow and spiral devices. The only leakage current is the current that flows along the racetrack paths instead of through the membranes and is expected to be minimal. The assembly of the device has fewer steps and is easier to automate. Components such as spacers in plate-and-frame and modular frames in cross-flow are not necessary In accordance with one or more embodiments, the design of a device having a racetrack configuration may involve numerous variables for optimization including number of cell pairs, length of the straight section(s) in the inner electrode, number of windings around the inner electrode and length of flow paths, flow velocity at the inlet to the dilute and concentrate compartments and inter-membrane spacing and type of screens in the diluting and concentrating compartments, which can be the same or different. The membrane area in the circular portions of the racetrack paths are subject to the non-uniform current density as in spiral devices. In those areas, the challenge of diminishing rate of ionic removal with distance from the inner electrode is present, and there may be a diminishing return in cost competitiveness as the number of windings is increased.

FIG. 1 is a schematic cross-section of an electrochemical separation module 100 with a racetrack configuration that features an anode 110 and a segmented cathode 120. Two stacks of cell pairs comprising anion and cation exchange membranes are wound around the anode 110 to form a bundle. The cathode 120 is segmented to form two sections that are configured to surround the bundle. Feed water, such as seawater, is introduced into inlets 130 that are positioned near the center of the racetrack near the anode 110. The feed water is fed to the diluting and concentrating compartments of the module through inlets 130 and then proceeds to flow outward to the cathode 120. Once the feed water has been treated by the diluting and concentrating compartments, the corresponding product and reject flows are collected at the outer ends of the racetrack configuration and exit the module through outlets 140. In some embodiments, the module may be configured so that the diluting and concentrating streams flow co-currently with each other in a substantially wound flow path from the anode to the cathode. In the alternative, the module may be configured so that the diluting and concentrating streams flow counter-current to each other. In another embodiment, the module may be configured so that one of the diluting and concentrating streams flows in a substantially wound flow path from the anode to the cathode, while the other of the diluting or concentrating streams flows in a substantially axial direction perpendicular to the other stream. This particular configuration may be suitable in applications where the conductivity of the feed water is low. In yet other embodiments, the module may be configured so that the diluting and concentrating streams flow inward from the outer cathode to the inner anode. For clarity, the thickness of all the components have been exaggerated and only two cell pairs per stack are shown in the figure, with the cell pairs wound around the anode only twice. In practice, the number of cell pairs and number of windings may be more, particularly if the membranes and any screens (discussed further below) are configured to be thin.

In some non-limiting embodiments, the anode 110 may be fabricated by taking a flat plate and then bending or rolling the ends. In the alternative, the anode may be constructed by welding sections of flat plate to sections shaped like half-cylinders. According to some embodiments, the membranes may be homogeneous in construction and be 0.025 mm thick, and the screens may be 0.25 mm thick, yielding a cell pair with a thickness of 0.55 mm. These dimensions would allow a stack of 50 cell pairs to subsequently be able to fit into an end section with a radius of 13.8 mm.

Figure 2:
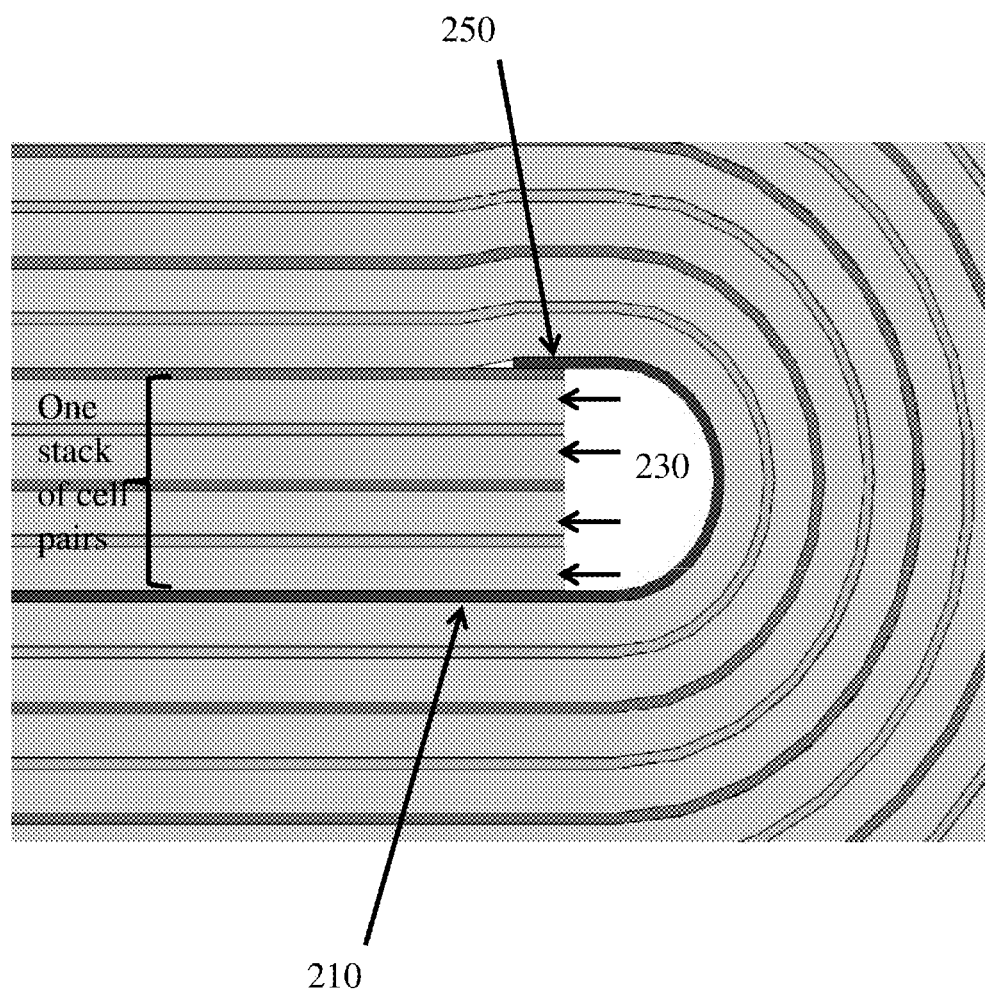
FIG. 2 presents a detailed view of a section of FIG. 1 in accordance with one or more embodiments.

FIG. 2 is an enlarged detail of one of the inlets 230 to the dilution and concentration compartments and positioned near the center of the racetrack configuration. In this particular embodiment, the anode 210 may comprise a straight section with a semi-circular section at each end to define a substantially elongated S-shape. The ends of the semi-circular section may further comprise a short straight section that may function as a fastener such as fastening tab 250. In various embodiments, the anode may comprise a fastening tab positioned at each end that secures one or more cells pairs to the anode. As illustrated, two stacks of rectangular membranes and screens may be inserted into end sections of the anode and mechanically clamped into place by fastening to the tabs 250. In some embodiments, the membranes and screens may be mechanically clamped into place by bending the tabs 250. The membranes and screens may then be wound around the anode to form a racetrack-shaped configuration. The substrate of the anode may be manufactured from various materials such as titanium and may be further coated on the surface with an oxidation-resistant material such as platinum, iridium oxide, ruthenium oxide, and mixtures thereof.

Figure 3A:
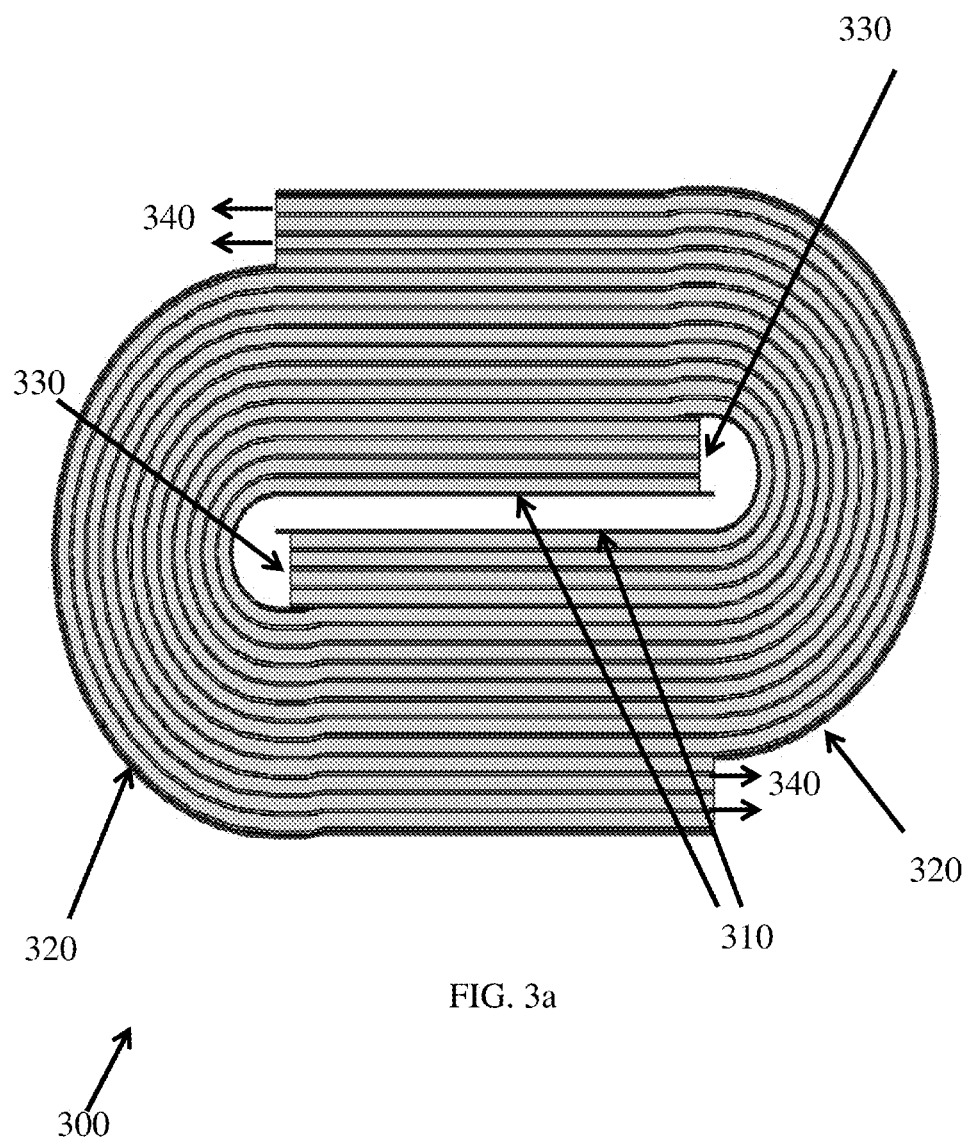
FIGS. 3a and 3b present schematics of an electrochemical separation device in accordance with one or more embodiments.
Figure 3B:
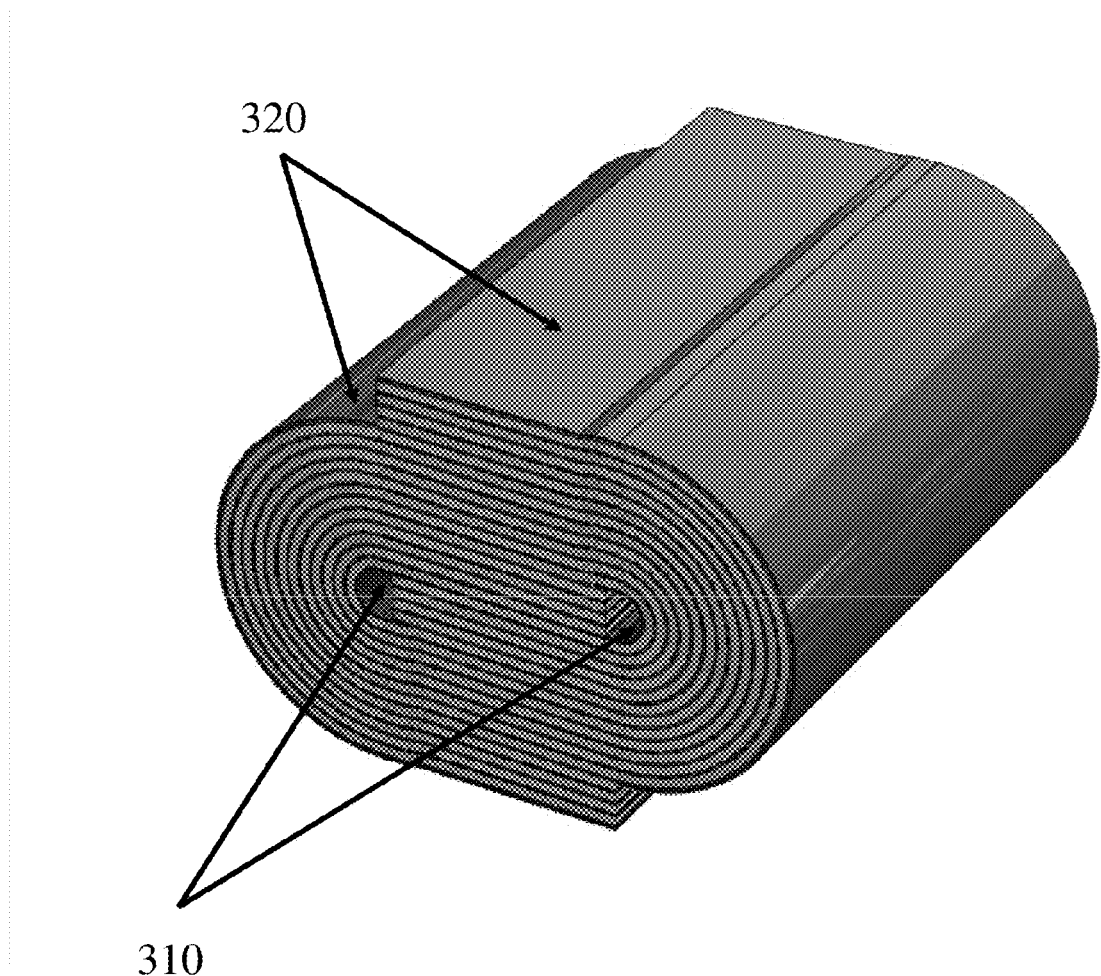

FIGS. 3a and 3b present schematics of an electrochemical separation module 300 with a racetrack configuration that features a segmented anode 310 and a segmented cathode 320. The anode is segmented to form two sections and two stacks of cell pairs comprising anion and cation exchange membranes are wound around the anode 310 to form a bundle. In a similar fashion as FIG. 1, feed water is introduced into inlets 330 that are positioned near the center of the racetrack near the anode 310 and then may proceeds to flow outward to the cathode 320 and exits the module through outlets 340. As previously discussed, the module may be configured so that the diluting and concentrating streams may flow co-currently or counter-currently to each other. The module may also be configured so that the diluting and concentrating streams flow in a substantially wound path from the anode to the cathode, or the module may be configured so that one of the diluting and concentrating streams flows in a substantially wound flow path from the anode to the cathode, while the other of the diluting or concentrating streams flows in a substantially axial direction perpendicular to the other stream. In the alternative, the module may be configured so that the diluting and concentrating streams flow inward from the outer cathode to the inner anode.

Figure 4:
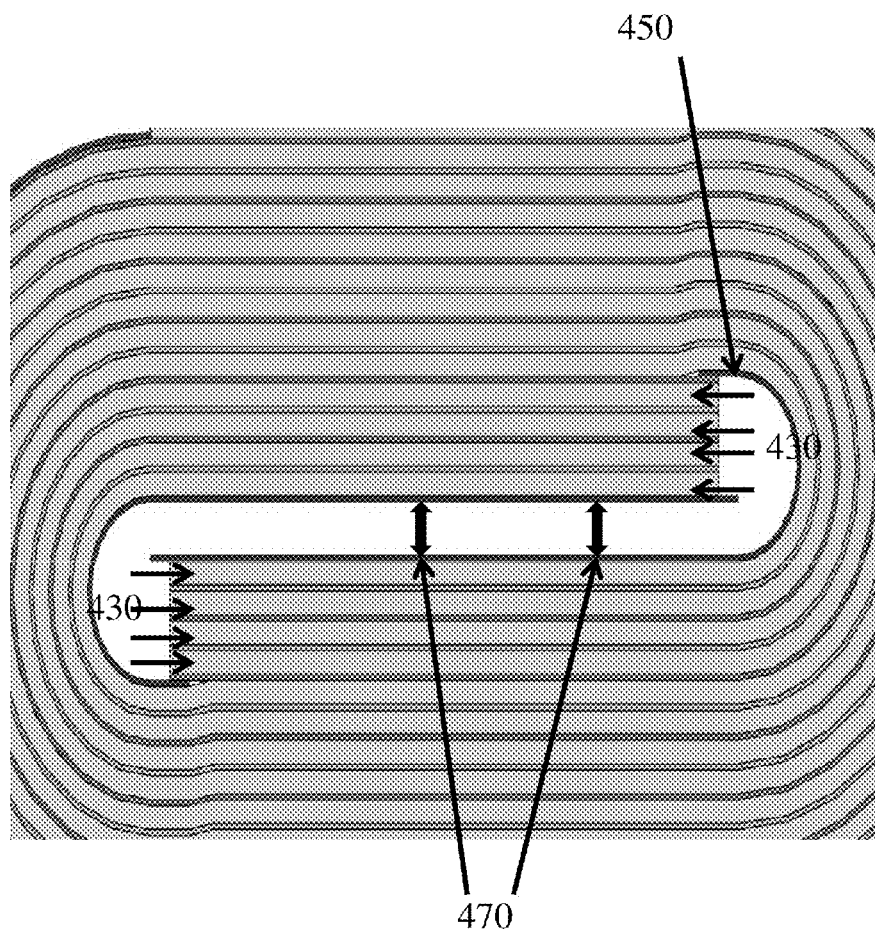
FIG. 4 presents a detailed view of a section of FIG. 3a in accordance with one or more embodiments.

FIG. 4 is an enlarged detail of the center region of FIG. 3a and shows the inlets 430 to the dilution and concentration compartments positioned near the center of the racetrack configuration. In this embodiment, the anode is segmented, with each section comprising a straight section and a curved section. When the anion and cation exchange membranes are wound around the anion, the corresponding bundle may also have a substantially straight section and a curved section. The segmented anode may allow for more flexibility in the construction of the module. For example, the radii of the curved sections of the anode and the curved sections of the bundle can be independent of the number of cell pairs, because the distance between the straight sections of the segmented anode may be varied. As illustrated in the figure, one or more spacers 470 may be positioned in between the straight sections of the segmented anode to push the two segments of the anode apart. The spacer may be configured to maintain a predetermined distance between the two segments of the anode. One example of a suitable type of spacer may be a screw-type mechanism. As previously discussed, the ends of the semi-circular curved sections of the anode may further comprise a short straight section that functions as a clamping tab 450 and in some embodiments, the anode may further comprise a fastener positioned at each end to secure one or more cells pairs to the anode.

Figure 5:
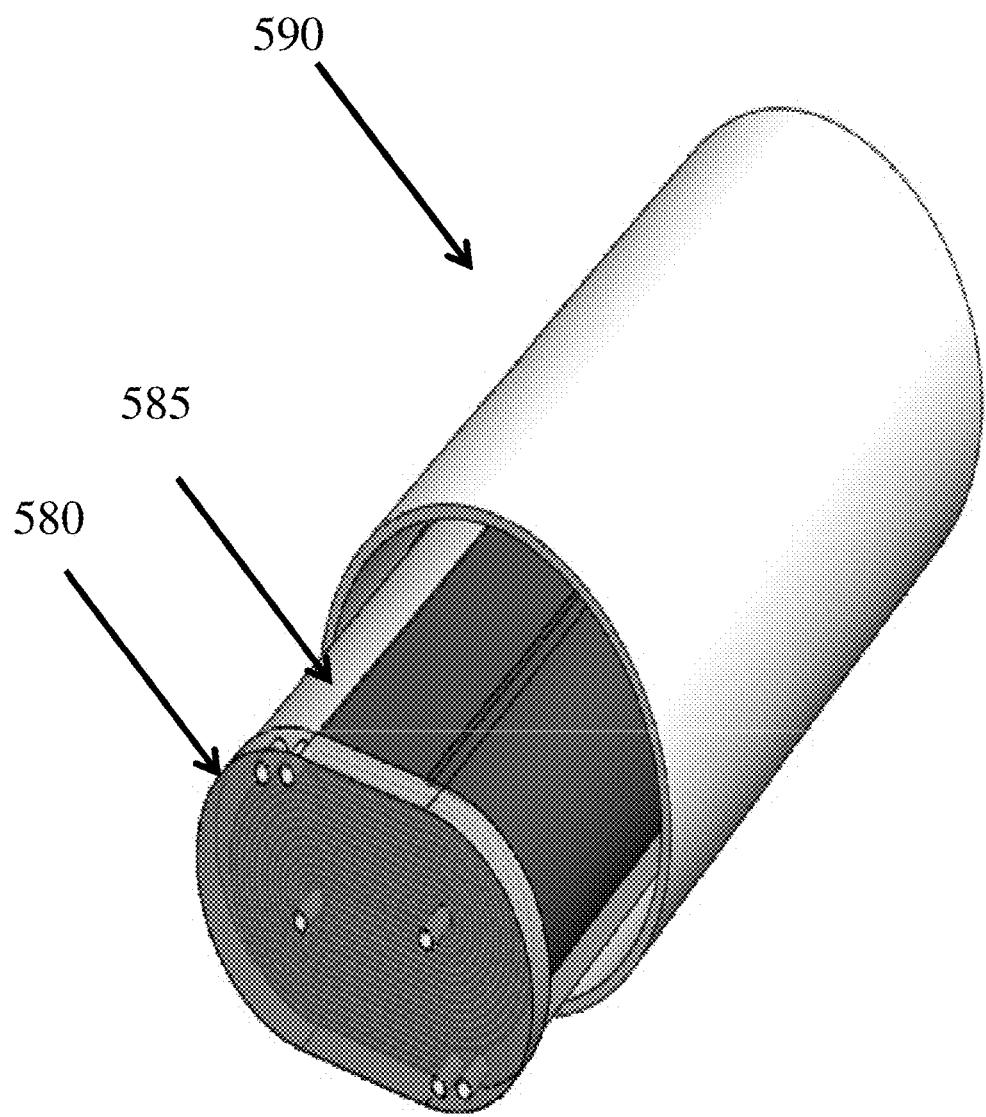
FIG. 5 presents a schematic of an electrochemical separation device housed in a vessel in accordance with one or more embodiments.

FIG. 5 illustrates a racetrack-wound bundle that has been placed in a vessel. A racetrack configuration bundle may be mounted in a vessel in various ways. In accordance with one or more non-limiting embodiments, once the one or more cell pairs are wound around the inner electrode, one or both of the ends of the bundle are sealed in potting adhesive 580 and trimmed. The potted bundle may then be inserted into a cylindrical vessel 590. The vessel may further comprise one or more endblocks (not shown). One or more outlet manifolds 585 may comprise outlets for the product and reject streams. Inlet manifolds may also be in fluid communication with the racetrack bundle. Any gap between the bundle and the inside of the vessel may be further filled with contoured parts (not shown) so that the vessel 590 functions to support the outer periphery of the bundle. The vessel 590 may be further capped at both ends by endblocks (not shown) that may provide the inlet and outlet ports and electrical connections to the electrodes. If contoured parts are used, they may be fabricated from low-cost and non-corrosive materials such as plastics and formed by molding or machining processing techniques. The contoured parts may also function to support the outer periphery of the bundle, or perform other functions. For example, one or more of the contoured parts may contain one or more manifolds for collecting the effluent from the reject or product streams and routing it to a corresponding port. In certain embodiments, the filler parts are not necessary. For example, the potted bundle may simply be inserted into a round vessel and endblocks may be attached. Filler material may then be injected into the space between the bundle and the inside surface of the vessel. Examples of suitable filler materials include rigid or semi-rigid potting compound and sealant foam, which may expand and solidify after being injected into the cavity. The vessel 590 may take on any number of different shapes, including rectangular or racetrack shapes. These configurations may enable multiple devices to be packed more compactly into the vessel. The vessel may be any shape that is suitable for performing as a housing for the bundle configurations described in the devices and systems disclosed herein.

According to some embodiments, a cross-section of the bundle formed from the wound anion and cation exchange membranes and the anode may have a substantially straight section and a curved section at first and second ends of the substantially straight section. In certain embodiments, the current density may be substantially uniform throughout the substantially straight section of the bundle. In various embodiments, a ratio of the length of the substantially straight section to a height or radius of each of the curved sections may be greater than zero. In at least one embodiment, the radius of the curved sections may not be dependent on the number of cell pairs. For example, the configuration of the device may be as shown in FIG. 3. According to some embodiments, the radius of each of the curved sections is equal to about the thickness of a stack. In various aspects, the anion and cation exchange membranes are planar and parallel along the substantially straight section of the bundle. In some embodiments, the bundle may have two axes of symmetry. In yet another embodiment, the curved sections may not be substantially semi-circular, but may be elliptical or other curved shape.

Figure 6A:
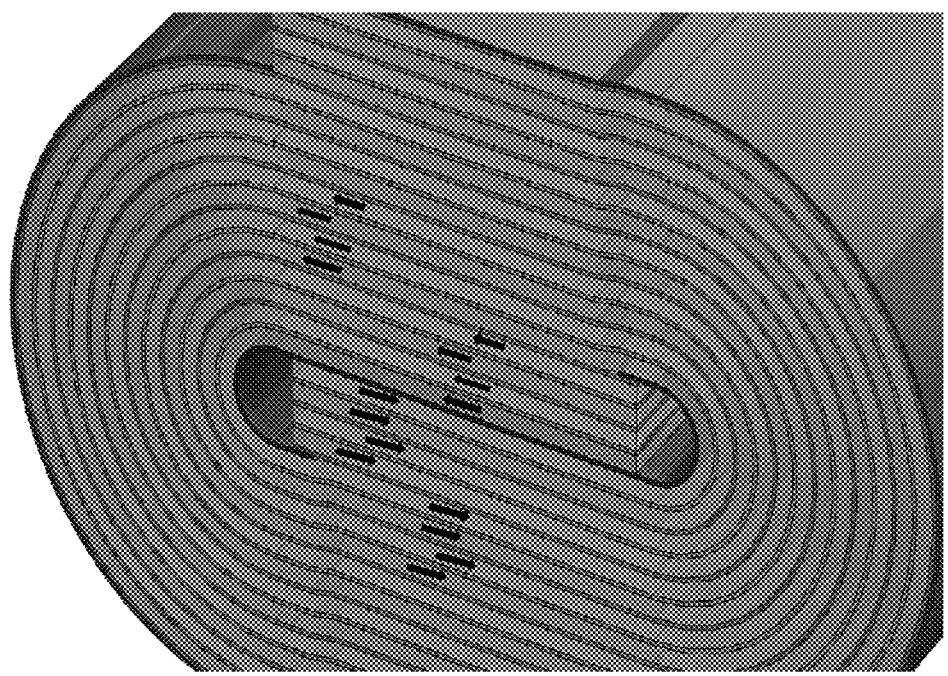
FIGS. 6a and 6b present schematics of various flow patterns in accordance with one or more embodiments.
Figure 6B:
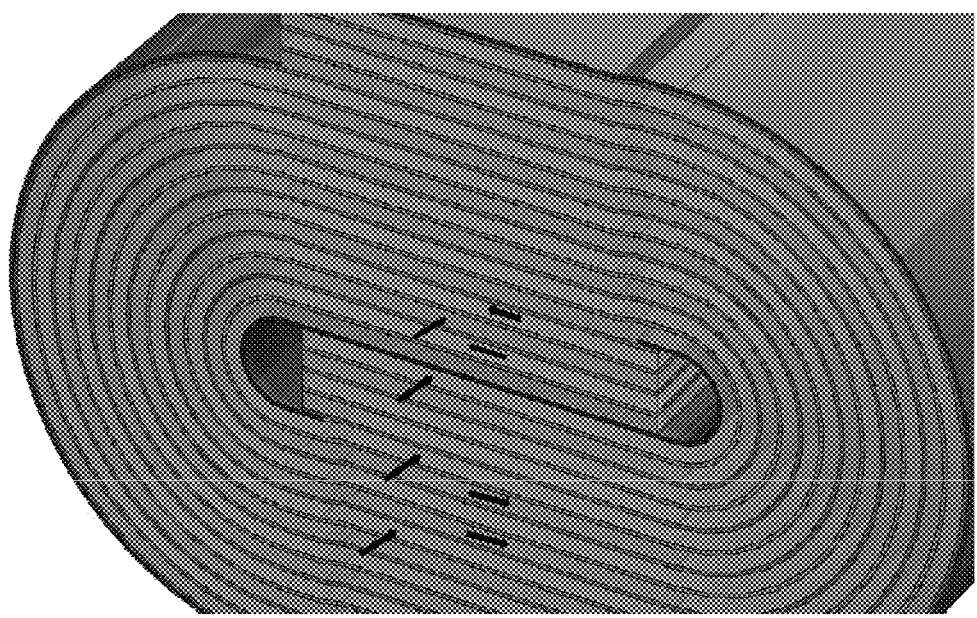

FIGS. 6a and 6b present schematics of different potential flow patterns in accordance with one or more embodiments. FIG. 6a presents both streams flowing co-currently in a racetrack pattern from an inner electrode to an outer electrode. Alternatively, the streams can flow co-currently from the outer electrode to the inner electrode. The streams can also flow counter-currently. FIG. 6b presents a cross-flow configuration in which a first stream flows co-currently in a racetrack pattern from an inner electrode to an outer electrode. The edges of stream 1 compartments may be sealed. Stream 2 flows in a direction perpendicular to stream 1. The edges of the compartments associated with stream 2 may be open.

According to at least one embodiment, the electrochemical separation device may be characterized by a membrane utilization of at least about 85%. In some embodiments, the membrane utilization may be at least about 90%. These values may be higher than those achieved using plate-and-frame designs. In addition, the pressure drop across the device may also be lower than the pressure drop across plate-and-frame designs.

In various embodiments, one or more of the electrochemical separation devices may be used in a water treatment system. The water treatment system may further comprise other components and devices, such as sensor and control devices, additional manifold and distribution assemblies, storage devices, and additional treatment devices. In some aspects, one or more of the electrochemical separation devices may be inserted into a pre-existing water treatment system.

The racetrack configuration of the disclosed electrochemical separation devices may offer certain advantages that are experienced by using plate-and-frame, cross-flow, and spiral-wound configurations, and may provide additional advantages that are not experienced by using these other types. For example, the membrane area bound by the substantially straight sections of the anode and cathode may be planar and parallel, allowing for a substantially uniform current density in this region. In addition, the rate of ionic removal from the diluting compartments is not a function of the distance from the inner electrode. These are distinct advantages over spiral-wound devices, since current density may decrease as the distance from the inner electrode increases in this type of configuration. This means that the ionic transfer rate from the dilute stream decreases as the diluting stream spirals outward. To achieve a desired level of ion removal, the current density at the inner electrode may be unacceptably high (on the order of several hundred amp/$m^2$). In addition, the membrane area may have to be increased by increasing the length of the spirals or by decreasing the flow rate through the dilution compartment. Both of these approaches require that the residence time be increased and may contribute to an increase in pressure drop across the device. In addition, increasing the membrane areas and spiral length may increase the cost of both manufacturing and operating the membranes. Furthermore, water loss associated with electro-osmosis and osmosis may contribute to a reduced flow rate of the product stream. Spiral-wound devices may also be disadvantaged by the fact that the number of cell pairs, and therefore the flow rate of the product exiting the device, may be limited by the size of the gaps between the anode segments and the difficulty in winding a large number of cell pairs around the central electrode. Increasing the radius of the segmented inner electrode in a spiral-wound device may increase the cost of the electrode, and this additional cost may be significant. Use of the racetrack configuration may minimize one or more of these disadvantages associated with the spiral-sound device.

A further advantage of the racetrack configuration may be that membrane utilization rates can be over 85%, since the only areas of the membrane that may not be actively used for ionic transfer are the small portions that are encapsulated by the potting compound. There may also be minimal leakage current, since this only occurs in the current that flows along the racetrack paths (instead of through the membranes). The device may require fewer steps to manufacture and assemble, and may be easier to automate or control. In addition, separate components such as spacers and frames may not be required.

Optimization of the electrochemical separation devices described herein may be achieved by varying one or more parameters, such as the number of cell pairs, the length of the substantially straight section(s) in the inner electrode, the number of windings around the inner electrode and the length of the flow paths, the flow velocity at the inlet(s), the spacing between the membranes, and the type of screens used in the diluting and concentrating compartments.

In accordance with one or more embodiments, a water treatment system is provided. In various embodiments, the water treatment system may be an electrochemical separation system, as described and characterized above. The water treatment system may include a feed inlet that is fluidly connected to a source of water to be treated. Non-limiting examples of suitable sources of water to be treated include sources of potable water, for example, municipal water or well water, sources of non-potable water, for example, brackish or salt-water, pre-treated semi-pure water, and any combination thereof.

The function and advantages of these and other embodiments will be more fully understood from the following example. The example is intended to be illustrative in nature and is not to be considered as limiting the scope of the embodiments discussed herein.

PROPHETIC EXAMPLE

A case study was conducted to evaluate manufacturing cost and energy consumption for the racetrack configuration in accordance with one or more embodiments in comparison to the conventional spiral-wound configuration. The case study focused on a desalination application assuming feed having a TDS value of 36,500 ppm and a desired product having a TDS value of 2000 ppm. This type of desalination plant may be useful for off-shore platform operations where supply water is injected into an oil reservoir to increase oil recovery.

The racetrack configuration included an ED module with four turns that included a straight section with a length of 200 mm. The spiral-wound module used for the study included 5 turns.

Figure 7:
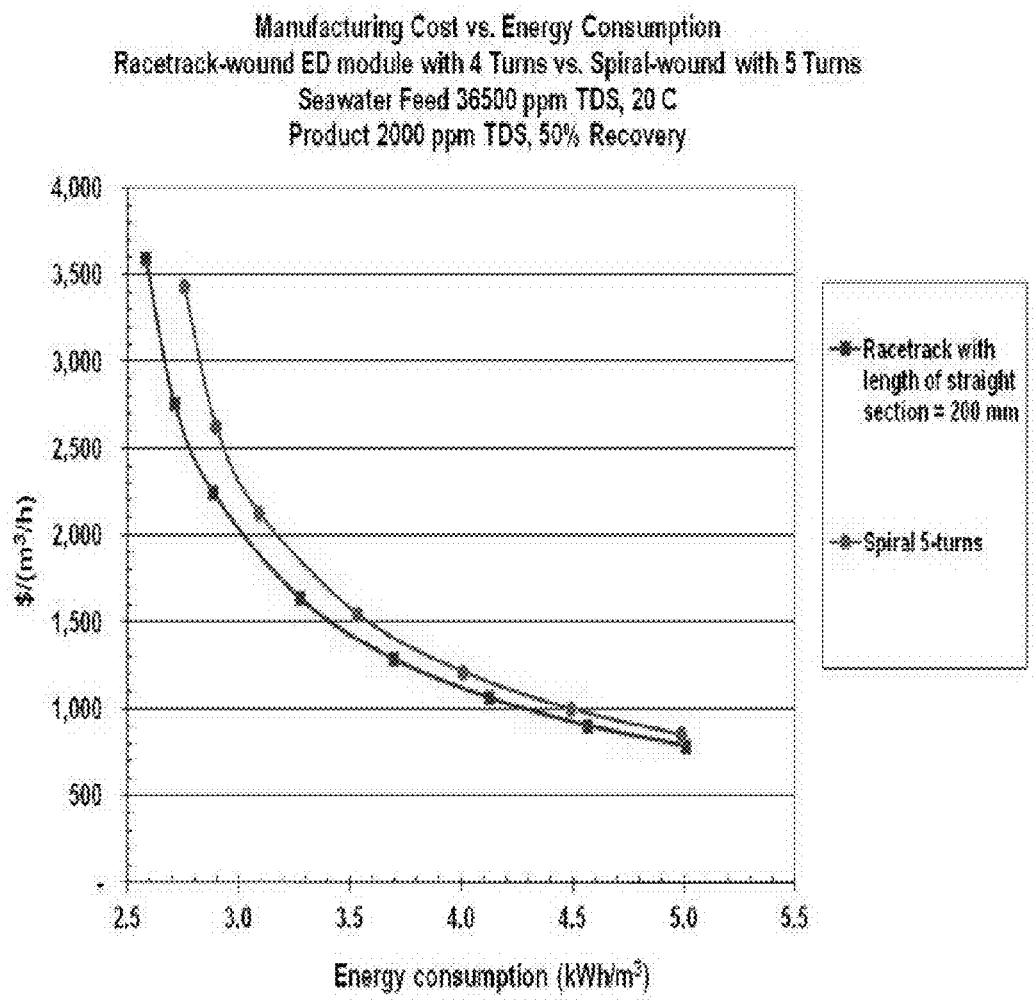
FIG. 7 presents data discussed in an accompanying Example in accordance with one or more embodiments.

The results of the study are shown in FIG. 7. The comparison between the two configurations included the manufacturing cost per unit of product flow rate ($m^3/h$), as indicated on the y-axis versus the energy consumption per cubic meter of product, as indicated on the x-axis. The results demonstrate that for a given energy consumption, the racetrack configuration is lower in cost. Across the entire range of energy consumption values, the racetrack configuration is consistently lower in cost than the conventional spiral-wound configuration.

It is to be appreciated that embodiments of the methods and devices discussed herein are not limited in application to the details of construction and the arrangement of components set forth in the description or illustrated in the accompanying drawings. The methods and devices are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having described above several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

The invention claimed is:

1. An electrochemical separation device, comprising:
   a first electrode comprising a straight section with a semi-circular section at each end to define a substantially elongated S-shaped anode;
   at least one cell pair comprising an anion exchange membrane and a cation exchange membrane wound around the first electrode to form a bundle; and
   a second electrode surrounding the bundle.

2. The device of claim 1, wherein the first electrode comprises an anode and wherein the second electrode comprises a cathode.

3. The device of claim 1, wherein the first electrode further comprises a fastening tab at each end to secure the at least one cell pair.

4. The device of claim 3, further comprising a spacer configured to maintain a predetermined distance between first and second segments of the anode.

5. A water treatment system, comprising the electrochemical separation device of claim 1.

* * * * *